(No Model.)

J. T. DUNCAN.
HOSE CLIP.

No. 590,094. Patented Sept. 14, 1897.

WITNESSES:
William P. Goebel.

INVENTOR
J. T. Duncan
BY
ATTORNEYS.

UNITED STATES PATENT OFFICE.

JOHN THOMAS DUNCAN, OF TORONTO, CANADA.

HOSE-CLIP.

SPECIFICATION forming part of Letters Patent No. 590,094, dated September 14, 1897.

Application filed December 16, 1896. Serial No. 615,902. (No model.)

*To all whom it may concern:*

Be it known that I, JOHN THOMAS DUNCAN, of Toronto, in the Province of Ontario and Dominion of Canada, have invented a new and Improved Hose-Clip, of which the following is a full, clear, and exact description.

The object of the invention is to provide a new and improved clip for securely and conveniently fastening the end of a hose to the shank of a nozzle or to a coupling, plug, or other device.

The invention consists principally of a split tubular spring-band formed with inwardly-extending beads, indentations, projections, or the like, the band by its resiliency being adapted to be opened to permit of springing the band upon the hose, and upon being released to close and cause the said beads, indentations, or the like to press the flexible material of the hose into corresponding recesses, indentations, or the like on the nozzle, plug, or other device.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1:
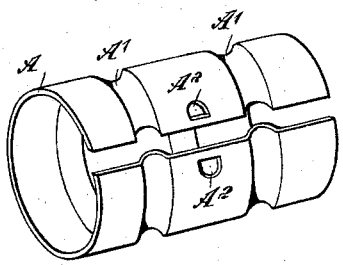
Figure 2:
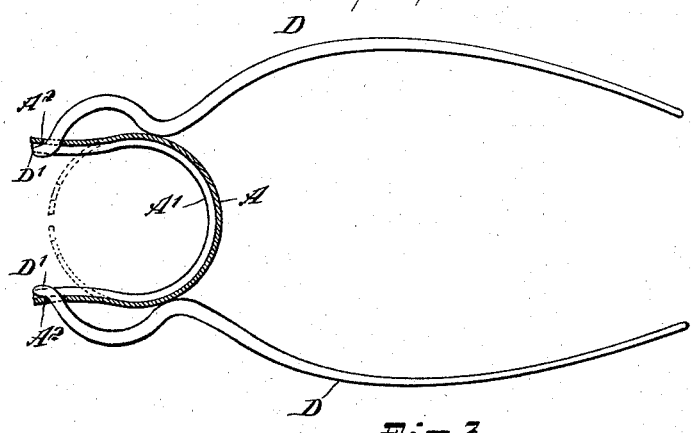

Figure 1 is a perspective view of the improvement. Fig. 2 is a cross-section of the same in an opened-up position by the use of a spring clip-opening device, and Fig. 3 is a longitudinal section of the improvement as applied on the hose and nozzle.

The improved hose-clip is made in the form of a split tubular spring-band A, of steel or similar material, to permit of forcibly opening the split ends of the band for applying it on the hose B, to secure the end thereof on a nozzle C, coupling, plug, or other device.

Figure 3:
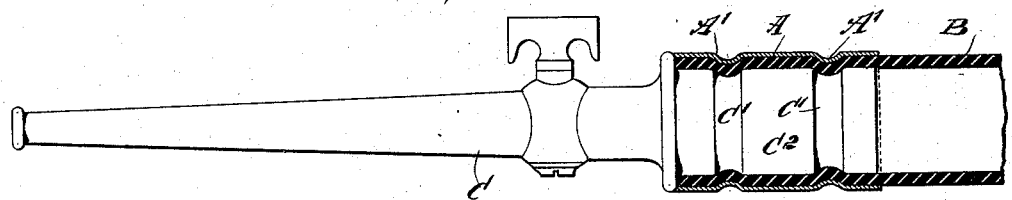

The band A is formed with beads A' or with projections, indentations, or the like spaced such distances apart and of such form that when the band is sprung upon the hose B then the said beads, indentations, or projections press the flexible material of the hose B into corresponding recesses C', formed on the shank C² of the nozzle C, as is plainly indicated in Fig. 3, it being understood that the resiliency of the band A in closing exerts sufficient pressure on the flexible material to firmly press the same into the said recesses C' and secure the hose to the nozzle, it being understood that the beads A', indentations, or the like are spaced the same distance apart and are of similar form to the recesses C' on the device on which the hose is to be fastened.

In order to properly open up the band A for springing it upon the hose, as above described, I employ a spring clip-opening device in the form of levers D, as indicated in Fig. 2, the said device being provided with tips D', curved in such a manner as to readily engage openings A², formed on the band A, at or near the middle thereof and near the edges of the split, as is plainly indicated in Fig. 1. The levers D may be made pivotally connected with each other to form pincers or pliers. Now it will be seen that in order to open the band A and to apply the same on the hose after the latter is in position on the nozzle C, I place the band A into the open levers D and engage the tips D' with the openings A² and then press the handle ends of the levers toward each other to force the tips D' apart and open up the band A, as plainly indicated in Fig. 2, and to permit of bodily carrying and pressing the band upon the hose. After this is done the operator releases the pressure of the levers of the clip-opening device, so that the resiliency of the band A will again cause it to close and press the flexible material of the hose into the recesses C'. The tips D' are thus disengaged from the openings A² and the clip-opening device is then removed from the band.

It will be seen that by the arrangement described the hose is securely fastened to the shank of the nozzle, coupling, plug, or similar device without the use of wires or the like and without requiring much skill on the part of the operator.

Having thus fully described my invention, I claim as new and desire to secure by Letters Patent—

1. As a new article of manufacture, a hose-clip consisting of a split, tubular spring-band formed with inwardly-extending beads, the band being arranged to be opened up to permit of springing the band upon the hose, and upon releasing it, permit it to close by its resiliency and cause the said beads to press the flexible material of the hose into corresponding recesses on the device on which the hose is to be fastened, substantially as shown and described.

2. As a new article of manufacture, a hose-clip consisting of a split, tubular spring-band formed with inwardly-extending beads, and with apertures near the middle of the band and near the edges of the split, substantially as shown and described.

JOHN THOMAS DUNCAN.

Witnesses:
F. B. FARWELL,
D. K. MASON.